March 24, 1936. N. J. DZIEDZIC ET AL 2,034,751
FEEDING DEVICE
Filed Sept. 15, 1931 2 Sheets-Sheet 2
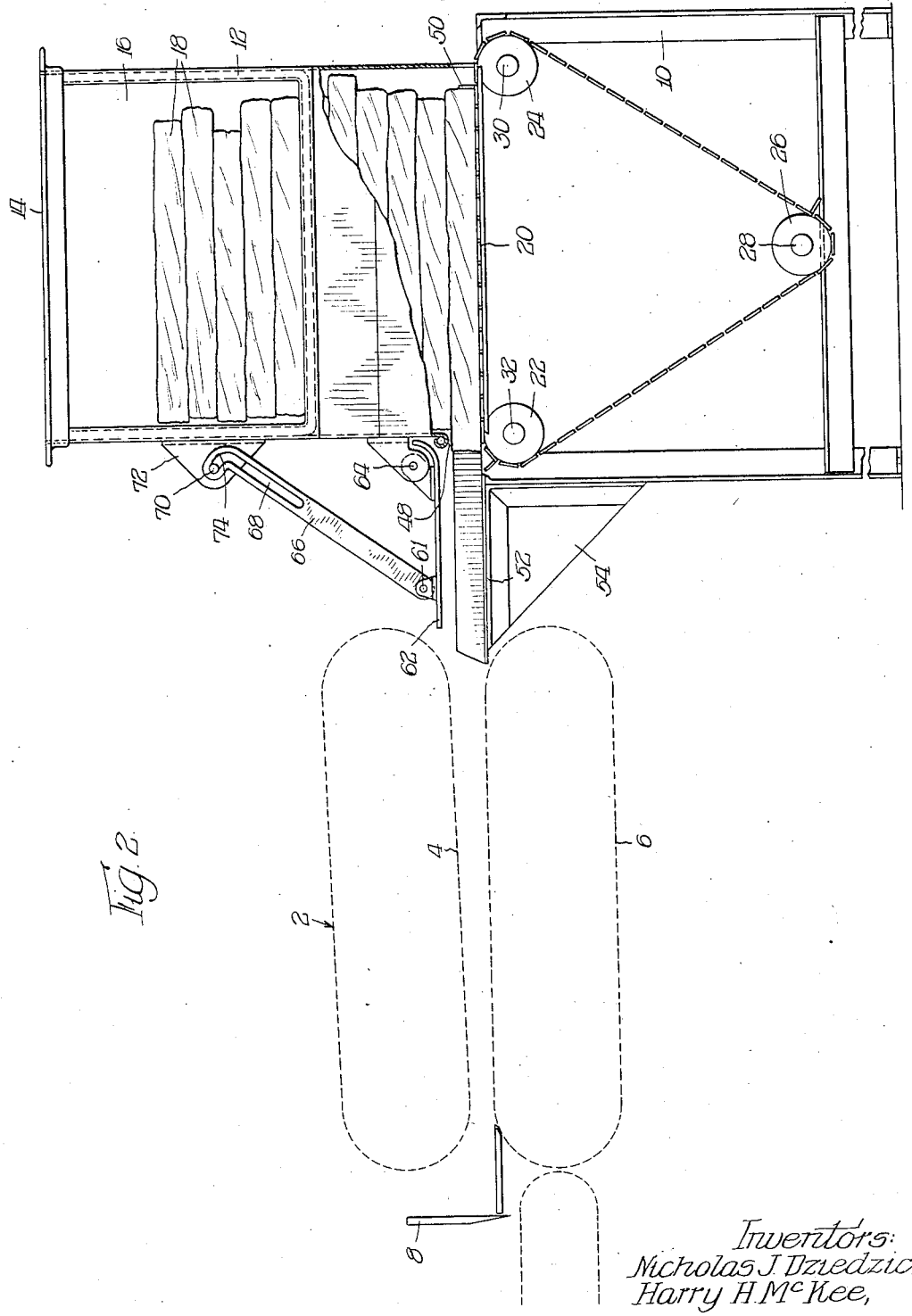
Inventors:
Nicholas J. Dziedzic,
Harry H. McKee, Patented Mar. 24, 1936

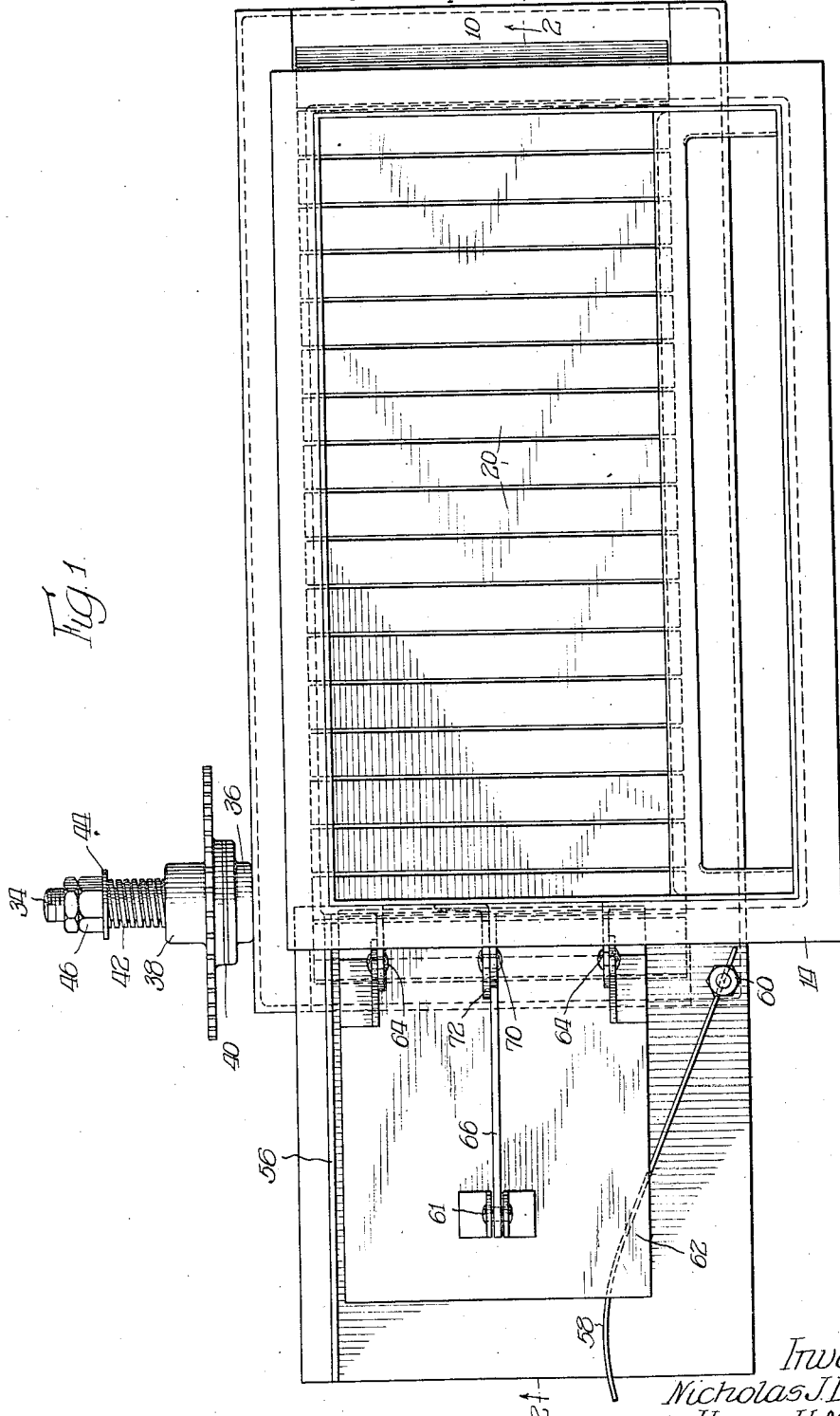

2,034,751

UNITED STATES PATENT OFFICE 2,034,751

FEEDING DEVICE

Nickolas J. Dziedzic and Harry H. McKee, Chicago, Ill., assignors to Industrial Patents Corporation, Chicago, Ill., a corporation of Delaware Application September 15, 1931, Serial No. 562,974

29 Claims. (Cl. 146—155)

The present invention relates to slicing machines and more in particular to automatic feeding devices therefor.

Among the objects of the present invention is to provide a novel automatic feeding device for use with a slicing machine and for transferring slabs or portions of meat to a cutting element whereby the same are sliced.

Another object of the present invention is to provide a novel feeding device for use in conjunction with a conveyor means of a slicing machine, this feeding device being adapted to feed or transfer slabs or portions of meat, such as bacon or the like, in abutting relation or contacting engagement whereby a uniform pressure exists between the slabs so that these slabs are uniformly sliced by a cutting element associated with the conveying means.

Still another object of the present invention is to provide a novel feeding device adapted for use in connection with a slicing machine having a constant speed conveyor means, the feeding device including a supply means or hopper for holding a plurality of slabs or portions of meat, such as bacon or the like, which may vary in length, and further including a conveyor means which is operable irrespective of the variations in length of these slabs, to transfer these slabs in contacting engagement and under uniform pressure to the constant speed conveyor means.

The present invention comprehends the idea of providing a novel feeding device adapted to be used in association with a constant speed conveying means of a slicing machine, the same including a variable speed conveyor means for the transfer of slabs of meat, such as bacon, in contacting engagement to the constant speed conveyor means, whereby successive slabs follow one another in immediate relation.

The present invention also includes as an object the idea of providing a novel feeding device including a conveyor means associated with a constant speed conveyor means of a slicing machine, drive means being included in the feeding device for operation thereof in accordance with the pressure between engaging transferred slabs of meat, such as bacon or the like. More particularly, this novel drive means includes friction elements having means associated therewith whereby the resistance between these elements may be varied in accordance with the variations in pressure between these contacting transferred slabs of bacon.

A still further object of the present invention is to provide a novel feeding device adapted to be associated with conveying means of a slicing machine, the same including a material supply means, such as a hopper or the like, for holding a plurality of superimposed slabs or portions of meat, such as bacon or the like, and a conveying means not only acting as a support for these slabs, but likewise being adapted to successively transfer the lowermost slab or portion in contacting engagement with the adjacent and previously transferred slab or portion to the conveying means of the slicing machine.

Referring to the drawings—

Figure 1 is a plan view of a feeding device made in accordance with the present invention.

Figure 2 is a view partly in section taken on line 2—2 of Figure 1 in which the feeding device is illustrated in association with a slicing machine diagrammatically shown.

Referring now more in detail to the drawings, a feeding device made in accordance with the invention is disclosed in association with a slicing machine provided with a feeding conveying means 2 comprising endless conveyor elements 4 and 6 suitably spaced apart as shown and adapted to be driven at substantially a constant speed for movement of a slab or portion of meat, such as bacon or the like, to a knife blade or element 8 adapted to be operated for severing successive slices from the slabs being transferred thereto.

The present novel feeding device includes a suitable frame 10 adapted to provide a support for a hopper 12 having an opening 14 at the top thereof, as likewise an opening 16 provided in a side. Slabs or portions of meat, such as the slabs of bacon 18, are adapted to be inserted through either one of these openings and positioned in superimposed relation upon an endless supply conveyor element 20 adapted to have its upper portion movable beneath the lower opening of the hopper 12, this conveying element 20 being supported for movement upon the upper sprockets 22 and 24 and adapted to pass around an idler sprocket 26 disposed adjacent the lower part of the frame 10.

The sprockets 24 and 26 are suitably supported upon the shafts 28 and 30 mounted in the frame 10 for guiding the endless conveyor element during movement thereof, while the sprocket 22 constitutes a driving means for the endless conveyor element 20, and is mounted upon a shaft 32 having its outer end 34 extending beyond the frame 10. Mounted upon this outer end 34 of the shaft 32 is a clutch element 36 and a drive sprocket 38 movably mounted upon the portion 34, and between which and the clutch element is provided a friction disc 40 for effecting a driving connection between the drive sprocket 38 and shaft 32. The frictional resistance between the friction disc and the drive sprocket 38 and element 36 is regulated through the medium of a coil spring 42 surrounding the shaft portion 34 and interposed between the drive sprocket 38 and a washer 44 held in adjusted positions by a nut 46 threaded on the shaft portion 34.

The slabs of bacon 18 are transferred through an opening 48 provided in one side of the hopper 12 and in a direction toward the opening between the conveyor elements 4 and 6 by means of the cleats 50 provided at spaced intervals along the endless conveyor element 20. These slabs of bacon are supported during transfer, from the conveyor element 20 to the conveyor elements 4 and 6, upon a plate 52 supported by suitable brackets 54 connected to the frame 10. These slabs of bacon are further guided by means of a guide plate 56 and a flat spring 58 adjustably connected, as shown at 60, to the support 52. These slabs of bacon are further held against upward displacement by a plate 62 which is hinged, as at 64, to the hopper 12, this plate 62 being locked in its substantially horizontal position, as shown in Figure 2 of the drawings, by means of a bracket 66, pivoted as at 61, the bracket 66 being provided with a slot 68 in its upper end adapted to engage with a pin 70 of a bracket 72 on the hopper 12. This slot 68 is provided with a portion 74 disposed at right angles to the remaining portion of the slot for reception of the pin 70 to lock the plate 62 in its horizontal position, but providing means whereby the plate may be swung upwardly, whereby cleaning of the feeding device and associated mechanism may be easily effected.

In actual practice, the slabs of bacon 18 vary somewhat in length, and in order to provide for the continuous operation of the slicing machine, it is necessary to provide a feeding device adapted to supply slabs of bacon in contacting relation one to the other, to the conveying elements 4 and 6. This is effected in the present disclosure by the conveying element 20 traveling at a faster speed than the conveying elements 4 and 6. Such an arrangement causes each and every one of the slabs of bacon 18 being released from the hopper 12 to gradually come into contacting engagement with the previously released slab of bacon moving in the direction of the conveying elements 4 and 6.

Inasmuch as the speed of movement of the conveyor element 20 is faster than the speed of the conveyor elements 4 and 6, suitable means have been provided whereby buckling between adjacent slabs of bacon does not take place in their movement to the conveying elements 4 and 6. This means is disclosed as the friction disc 40 whereby slippage may occur between the drive sprocket 38 and the conveying element 20, this slippage eliminating any possibility of buckling of adjacent slabs of bacon inasmuch as the speed of the conveyor element 20 is reduced as soon as the pressure between adjacent transferred slabs of bacon equals or is in excess of the frictional resistance between the sprocket 38 and the friction disc 40.

It will be quite apparent from the above disclosure that novel means has been provided for automatically and continuously feeding slabs of bacon in contacting relation and under uniform pressure to a cutting element of a slicing machine, whereby uniform slices are severed therefrom, and even though substantial variations in length exist between adjacent transferred slabs of bacon.

While we have herein described and upon the drawings shown an illustrative embodiment of the invention, it is to be understood that the invention is not limited thereto but may comprehend other constructions, arrangements of parts, details and features without departing from the spirit of the invention.

Having thus disclosed the invention—

We claim:

1. In a slicing machine having a cutting element, the combination of a conveyor means associated with said element for transferring slabs of meat to said cutting element, and means for supplying said slabs to said conveyor means in endwise direction so that the slabs thus supported have end to end abutting engagement when on said conveyor means, said supplying means including a conveyor means, and a friction drive means to allow for slippage between said drive means and last named conveyor means when the slab ends abut.

2. In a slicing machine having a cutting element and a constant speed conveyor means associated with said element for transferring slabs of meat thereto, means for supplying said slabs to said conveyor means, said means including a hopper for holding said slabs in superimposed relation, a conveyor means for engaging a lowermost slab at intervals for transfer of the same toward said first named conveyor means, and drive means for said second named conveyor means for effecting a transfer of said slabs in contacting engagement to said first named conveyor means, said drive means including means allowing slippage of said drive means when a given pressure between said contacting slabs has been reached.

3. In a slicing machine having a cutting element and a constant speed conveyor means associated with said element for transferring slabs of meat thereto, means for supplying said slabs to said conveyor means, said means including a hopper for holding said slabs in superimposed relation, a conveyor means for engaging a lowermost slab at intervals for transfer of the same toward said first named conveyor means, drive means for said second named conveyor means for effecting a transfer of said slabs in contacting engagement to said first named conveyor means, said drive means including means allowing slippage of said drive means when a given pressure between said contacting slabs has been reached, and means for adjusting said drive means whereby the same is affected by varying pressures between the contacting slabs..

4. In a slicing machine having a cutting element and a constant speed conveyor means associated with said element for transferring slabs of meat thereto, means for supplying said slabs to said conveyor means, said means including conveyor means for transferring slabs in contacting engagement to said first mentioned conveyor means at a greater speed than the latter to maintain a constant pressure on the slabs, a drive means for said second conveyor means operable in accordance with the pressure between said engaging slabs, and means associated with said drive means for permitting slippage of said drive means in accordance with variations in pressure between said slabs to maintain a uniform predetermined pressure on the slabs and prevent buckling of the same.

5. In a slicing machine having a cutting element and a constant speed conveyor means associated with said element for transferring slabs of meat thereto, means for supplying said slabs to said conveyor means, said means including conveyor means for transferring slabs in contacting engagement to said first mentioned conveyor means, drive means for said second named conveyor means, said drive means including friction elements operable in accordance with the pressure between said engaging slabs and means for varying the resistance between said elements to correspond with variations of pressure desired between said engaging slabs.

6. A feeding means comprising in operative combination a constant speed conveyor means for transferring slabs of meat to a place where successive operations thereupon can be performed, means for supplying said slabs to said conveyor means, said slab supplying means including a hopper for holding said slabs in superposed relationship, a second conveyor means for engaging a lowermost slab at intervals for transfer of the same towards said first named conveyor means and drive means for said second conveyor means, for effecting a transfer of said slabs in contacting engagement to said first named conveyor, said drive means including means allowing slippage of said drive means when a given pressure between said contacting slabs has been reached.

7. A feeding means comprising in operative combination a constant speed conveyor means for transferring slabs of meat to a place where cutting operations thereupon can be successively performed, means for supplying said slabs to said conveyor means, which last mentioned means includes a hopper for holding said slabs in superposed relation, a second conveyor means for at intervals engaging the lowermost of said superposed slabs in a manner to transfer the lowermost slab thus engaged towards said first named conveyor, drive means for said second named conveyor for effecting a transfer of said slabs in contacting engagement to said first named conveyor means, said drive means including means allowing slippage of said drive means when a given pressure between said contacting slabs has been reached, and means for adjusting said drive means whereby the same is affected by varying pressures between the contacting slabs.

8. A feeding mechanism which comprises in operative combination a constant speed conveyor means for transferring slabs of meat to a place where successive operations thereupon can be performed, a supply means from which slabs of meat to be operated upon are stored preparatory to being operated thereupon, which said supply means includes a hopper for holding said slabs in superposed relation, a second conveyor means for at intervals engaging the lowermost of said superposed slabs in a manner to transfer the lowermost slab thus engaged from said hopper towards said first named conveyor means, drive means for said second named conveyor means for effecting a transfer of said slabs in contacting engagement to said first named conveyor means, which said drive means includes means allowing slippage of said drive means when a given pressure between said contacting slabs has been reached and also including means for adjusting said drive means whereby the same is effected by varying pressures between the contacting slabs, and an intermediate supporting and guiding means provided between said constant speed conveyor means and said second conveyor means, which said intermediate supporting and guiding means comprises a bottom supporting plate arranged to receive a part of a slab delivered thereto by said second conveyor means and to guide said slab to said constant speed conveyor means, a side guide plate for engagement by the side of the slab as fed forwardly from the second conveying means to said constant speed conveying means, a side spring pressed guide spaced from but normally pressing towards said side guide plate for engaging a side of the bacon slab and for forcing the bacon slab against said side guide plate as the bacon slab is fed forwardly, and a hinged upper plate vertically spaced above the bottom supporting plate, which upper plate is mounted so as to provide a yielding downward pressure against the slab as it passes forwardly thereunder.

9. In a bacon slicing machine having a cutting element adapted to be operated for severing successive slices from bacon slabs as transferred thereto, a constant speed conveyor means associated with said cutting element for transferring the slabs of bacon thereto, a hopper wherein slabs of bacon to be cut are supported in superposed relationship, means for successively transferring the lowermost of said slabs of bacon from said hopper to said conveyor means, said last mentioned means including a conveyor means for transferring the slabs in contacting engagement with each other to and upon said first mentioned conveying means, and a drive means for operating said second conveyor means at a greater speed than the constant speed conveying means to maintain slabs on the latter under constant pressure, said drive means including means for permitting slippage in accordance with the pressure between said engaging slabs to maintain a predetermined uniform pressure on the slabs.

10. In a bacon slicing machine having a cutting element adapted to be operated for severing successive slices of bacon from a slab as transferred thereto, a constant speed conveyor means associated with said cutting element for transferring the slabs of bacon thereto, a hopper wherein slabs of bacon to be sliced are stored in superposed relationship, means for transferring the lowermost of said superposed slabs of bacon to said conveyor means, said last mentioned means being constructed so that the slabs of bacon transferred thereby are positioned in end to end contacting engagement on said first mentioned conveyor means, a drive means for said second conveyor means operable in accordance with the pressure between said engaging slabs, and means associated with said drive means for effecting operation of said drive means in accordance with variations in pressure between said slabs.

11. In a bacon slicing machine having a cutting element, a constant speed conveyor means associated with said element for transferring slabs of bacon thereto, a supply means for holding slabs of bacon to be cut, which supply means includes a hopper wherein slabs of bacon are arranged in superposed relationship, means including a conveyor means for transferring the lowermost of said slabs of bacon from said hopper to said first mentioned conveyor means and in end to end contact with a slab of bacon on said first mentioned conveyor means, and drive means for operating said second named conveyor means at a greater speed than the constant speed conveying means to maintain slabs on the latter under constant pressure, which said drive means includes friction elements for permitting slippage in accordance with the pressure between said engaging slabs to maintain a predetermined uniform pressure on the slabs.

12. In a bacon slicing machine having a cutting element, a constant speed conveyor means associated with said cutting element for transferring slabs of bacon thereto, means for holding a supply of slabs which are to be passed to said conveyor means, which said supply means comprises a hopper wherein bacon slabs are arranged in superposed relationship, means including a conveyor for transferring the lowermost slab from said hopper to said first mentioned conveyor means and in contacting engagement with a slab end still on said first mentioned conveyor means, and drive means for said second named conveyor means, which said drive means includes friction elements operable in accordance with the pressure between said engaging slabs and also includes means for varying the resistance between said elements to correspond with variations of pressure between said engaging slabs.

13. In a slicing machine, the combination with a cutting element, of a constant speed conveyor arranged to feed slabs of bacon to the cutting element, a second conveyor arranged to feed slabs of bacon to the constant speed conveyor, means for continuously supplying slabs of bacon to the second conveyor, driving mechanism for moving the second conveyor at a sufficiently greater rate of speed than the constant speed conveyor for feeding the slabs of bacon in end to end contact on the constant speed conveyor, said driving mechanism including means for allowing slippage for reducing the speed of the second conveyor when the slabs are thus brought in end to end contact and a given pressure between the contacting slabs has been reached and means for holding the slabs of bacon against upward displacement to prevent the slabs of bacon from buckling under the constant forward pressure on the same.

14. In a slicing machine, the combination with a cutting element, of a constant speed conveyor arranged to feed slabs of bacon to the cutting element, a second conveyor arranged to feed slabs of bacon to the constant speed conveyor, means for continuously supplying slabs of bacon to the second conveyor, driving mechanism for moving the second conveyor at a sufficiently greater rate of speed than the constant speed conveyor for feeding the slabs of bacon in end to end contact on the constant speed conveyor, said driving mechanism including means for allowing slippage for reducing the speed of the second conveyor when the slabs are thus brought in end to end contact and a given pressure between the contacting slabs has been reached, guiding means located between the conveyors for transferring the slabs of bacon from the second conveyor to the constant speed conveyor, and means for holding the slabs of bacon against upward displacement while the same are being transferred from one conveyor to the other and for holding the slabs down upon the conveyors to prevent the slabs of bacon from buckling under the constant forward pressure on the same.

15. In a slicing machine, the combination with a cutting element, of a constant speed conveyor arranged to feed slabs of bacon to the cutting element, a second conveyor arranged to feed slabs of bacon to the constant speed conveyor, a hopper located above the second conveyor and adapted to receive a stack of slabs of bacon with the lowermost slab of the stack resting upon the second conveyor, whereby the latter is constantly supplied with slabs of bacon, driving mechanism for moving the second conveyor at a sufficiently greater rate of speed than the constant speed conveyor for feeding the slabs of bacon in end to end contact on the constant speed conveyor, said driving mechanism including means for allowing slippage for reducing the speed of the second conveyor when the slabs are thus brought in end to end contact and a given pressure between the contacting slabs has been reached, and means for holding the slabs of bacon against upward displacement to prevent the slabs from buckling under the constant forward pressure on the same.

16. In a slicing machine, the combination with a cutting element, of a constant speed conveyor arranged to feed slabs of bacon to the cutting element, a second conveyor arranged to feed slabs of bacon to the constant speed conveyor, a hopper located above the second conveyor and adapted to receive a stack of slabs of bacon with the lowermost slab of the stack resting upon the second conveyor, whereby the latter is constantly supplied with slabs of bacon, driving mechanism for moving the second conveyor at a sufficiently greater rate of speed than the constant speed conveyor for feeding the slabs of bacon in end to end contact on the constant speed conveyor, said driving mechanism including means for allowing slippage for reducing the speed of the second conveyor when the slabs are thus brought in end to end contact and a given pressure between the contacting slabs has been reached, said second conveyor being provided with slab engaging means for removing the slabs of bacon from the hopper and for carrying the same forward in abutting relation to the constant speed conveyor, and means for holding the slabs of bacon against upward displacement to prevent the slabs from buckling under the constant forward pressure on the same.

17. In a slicing machine, the combination with a cutting element, of a constant speed conveyor arranged to feed slabs of bacon to the cutting element, a second conveyor arranged to feed slabs of bacon to the constant speed conveyor, a hopper located above the second conveyor and constructed to receive a stack of slabs of bacon with the lowermost slab of the stack resting upon the second conveyor, driving mechanism for moving the second conveyor at a sufficiently greater rate of speed than the constant speed conveyor for feeding the slabs of bacon to the constant speed conveyor more rapidly than the constant speed conveyor can feed the slabs to the cutting element and thereby maintain the slabs of bacon on the constant speed conveyor in constant contact and under a constant pressure, said driving mechanism having means for limiting the pressure on the slabs so as to maintain a predetermined uniform pressure on the slabs of bacon, means located between the conveyors for guiding the slabs of bacon from one conveyor to the other, and means for holding the slabs of bacon against upward displacement while they are being transferred from one conveyor to the other.

18. In a slicing machine, the combination with a cutting element, of a constant speed conveyor arranged to feed slabs of bacon to the cutting element, a second conveyor arranged to feed slabs of bacon to the constant speed conveyor, a hopper located above the second conveyor and constructed to receive a stack of slabs of bacon with the lowermost slab of the stack resting upon the second conveyor, driving mechanism for moving the second conveyor at a sufficiently greater rate of speed than the constant speed conveyor for feeding the slabs of bacon to the constant speed conveyor more rapidly than the constant speed conveyor can feed the slabs to the cutting element and thereby maintain the slabs of bacon on the constant speed conveyor in constant contact and under a constant pressure, said driving mechanism having means for limiting the pressure on the slabs so as to maintain a predetermined uniform pressure on the slabs of bacon, means located between the conveyors for guiding the slabs of bacon from one conveyor to the other, and means for holding the slabs of bacon against upward displacement while they are being transferred from one conveyor to the other, said second conveyor being provided at intervals with means for engaging the lowermost slab of bacon of the stack within the hopper for removing the slabs of bacon from the hopper and for advancing them in abutting relation.

19. In a slicing machine, the combination with a cutting element, of a constant speed conveyor arranged to feed slabs of bacon to the cutting element, a second conveyor arranged to feed slabs of bacon to the constant speed conveyor, means for continuously supplying slabs of bacon to the second conveyor, and driving mechanism for moving the second conveyor at a sufficiently greater rate of speed than the constant speed conveyor for feeding the slabs of bacon to the constant speed conveyor more rapidly than the constant speed conveyor can feed the slabs of bacon to the cutting element and thereby maintain the slabs of bacon on the constant speed conveyor in constant abutting relation with one another under a constant pressure against one another, said driving mechanism including a friction clutch adapted to yield under a predetermined pressure on the slabs so as to maintain a uniform pressure of the slabs on one another to prevent buckling of the slabs.

20. In a slicing machine, the combination with a cutting element, of a constant speed conveyor arranged to feed slabs of bacon to the cutting element, a second conveyor arranged to feed slabs of bacon to the constant speed conveyor, means for continuously supplying slabs of bacon to the second conveyor, driving mechanism for moving the second conveyor at a sufficiently greater rate of speed than the constant speed conveyor for feeding the slabs of bacon to the constant speed conveyor more rapidly than the constant speed conveyor can feed the slabs of bacon to the cutting element and thereby maintain the slabs of bacon on the constant speed conveyor in constant abutting relation with one another under a constant pressure against one another, said driving mechanism including a friction clutch adapted to yield under a predetermined pressure on the slabs so as to maintain a uniform pressure of the slabs on one another to prevent buckling of the slabs, guiding means located between the conveyors for transferring the slabs of bacon from one conveyor to the other, and means for holding the slabs against upward displacement while the slabs of bacon are being transferred from the second conveyor to the constant speed conveyor.

21. In a slicing machine, the combination with a cutting element, of a constant speed conveyor arranged to feed slabs of bacon to the cutting element, a second conveyor arranged to feed slabs of bacon to the constant speed conveyor, a hopper located above the second conveyor and constructed to receive a stack of slabs of bacon with the lowermost slab resting upon the second conveyor, driving mechanism for moving the second conveyor at a sufficiently greater rate of speed than the constant speed conveyor for feeding slabs of bacon to the constant speed conveyor more rapidly than the constant speed conveyor can feed slabs of bacon to the cutting element and thereby maintain the slabs of bacon on the constant speed conveyor in constant contact with one another and under a constant pressure one against another, said driving mechanism including a friction clutch yieldable under a predetermined pressure of the slabs so as to maintain a uniform predetermined pressure of the slabs of bacon one against another to prevent the slabs from buckling, guiding means located between the conveyors for transferring the slabs of bacon from one conveyor to the other, and means for holding the slabs against upward displacement while the slabs of bacon are being transferred from the second conveyor to the constant speed conveyor.

22. In a slicing machine, the combination with a cutting element, of a constant speed conveyor arranged to feed slabs of bacon to the cutting element, a second conveyor arranged to feed slabs of bacon to the constant speed conveyor, a hopper located above the second conveyor and constructed to receive a stack of slabs of bacon with the lowermost slab resting upon the second conveyor, driving mechanism for moving the second conveyor at a sufficiently greater rate of speed than the constant speed conveyor for feeding slabs of bacon to the constant speed conveyor more rapidly than the constant speed conveyor can feed slabs of bacon to the cutting element and thereby maintain the slabs of bacon on the constant speed conveyor in constant contact with one another and under a constant pressure one against another, said driving mechanism including a friction clutch yieldable under a predetermined pressure of the slabs so as to maintain a uniform predetermined pressure of the slabs of bacon one against another to prevent the slabs from buckling, guiding means located between the conveyors for transferring the slabs of bacon from one conveyor to the other, and means for holding the slabs against upward displacement while the slabs of bacon are being transferred from the second conveyor to the constant speed conveyor, said second conveyor being provided at intervals with means for engaging the lowermost slab of bacon of the stack within the hopper for positively removing the slabs of bacon from the hopper and for advancing the slabs in abutting relation one against another.

23. In a slicing machine, the combination with a cutting element, of a constant speed conveyor arranged to feed slabs of bacon to the cutting element, a second conveyor arranged to feed slabs of bacon to the constant speed conveyor, a hopper located above the second conveyor for holding slabs of bacon in superimposed relation with the lowermost slab resting upon the second conveyor, driving mechanism for moving the second conveyor at a sufficiently greater rate of speed than the constant speed conveyor for feeding the slabs of bacon in end to end contact on the constant speed conveyor, said driving mechanism including means for allowing slippage for reducing the speed of the second conveyor when the slabs are thus brought in end to end contact and a given pressure between the contacting slabs has been reached, means for effecting a transfer of said slabs of bacon in contacting engagement from the second conveyor to the constant speed conveyor, and means for holding the slabs of bacon against upward displacement to prevent the slabs from buckling under the constant forward pressure on the same.

24. In a slicing machine, the combination with a cutting element, of a constant speed conveyor arranged to feed slabs of bacon to the cutting element, a second conveyor arranged to feed slabs of bacon to the constant speed conveyor, a hopper located above the second conveyor for holding slabs of bacon in superimposed relation with the lowermost slab resting upon the second conveyor, driving mechanism for moving the second conveyor at a sufficiently greater rate of speed than the constant speed conveyor for feeding the slabs of bacon to the constant speed conveyor more rapidly than the constant speed conveyor can feed the slabs of bacon to the cutting element and thereby maintain the slabs of bacon on the constant speed conveyor in constant contact with one another and under a constant pressure one against another, and means for effecting a transfer of said slabs of bacon in contacting engagement from the second conveyor to the constant speed conveyor, said driving mechanism including means allowing slippage of said driving means when a given pressure between said contacting slabs has been reached.

25. In a slicing machine, the combination with a cutting element, of a constant speed conveyor arranged to feed slabs of bacon to the cutting element, a second conveyor arranged to feed slabs of bacon to the constant speed conveyor, a hopper located above the second conveyor for holding slabs of bacon in superimposed relation with the lowermost slab resting upon the second conveyor, driving mechanism for moving the second conveyor at a sufficiently greater rate of speed than the constant speed conveyor for feeding the slabs of bacon to the constant speed conveyor more rapidly than the constant speed conveyor can feed the slabs of bacon to the cutting element and thereby maintain the slabs of bacon on the constant speed conveyor in constant contact with one another and under a constant pressure one against another, means for effecting a transfer of said slabs of bacon in contacting engagement from the second conveyor to the constant speed conveyor, said driving mechanism including means allowing slippage of said driving means when a given pressure between said contacting slabs has been reached, and means for adjusting said driving means whereby the same is effected by varying pressures between the contacting slabs.

26. In a slicing machine, a conveyor for feeding slabs of bacon, a hopper located above the conveyor for holding slabs of bacon in superposed relation, the lower portion of the hopper being open to permit the lowermost slab to rest upon the said conveyor, a supporting table arranged to receive the slabs of bacon from the conveyor, a longitudinally extending side guide plate carried by the table and arranged to be engaged by and to guide the slab of bacon in a forwardly longitudinal direction as it is transferred from the hopper to the table by the said conveyor, a second side guide member transversely spaced from the said side guide plate and comprising a spring element arranged to normally press the bacon slab towards the said guide plate as the slab moves longitudinally forwardly, and a yieldable top pressing plate located above the table for normally pressing downwardly upon the bacon slab as it is fed forwardly along said table.

27. In a slicing machine, the combination with a cutting element, of a feed conveyor arranged to feed slabs of bacon to the cutting element, a supply conveyor arranged to supply slabs of bacon to the feed conveyor, means for supplying slabs of bacon to the supply conveyor and driving mechanism for moving the supply conveyor at a sufficiently greater rate of speed than the feed conveyor for feeding slabs of bacon in end to end contact on the feed conveyor, said driving mechanism including means for reducing the speed of the supply conveyor when the slabs are thus brought in end to end contact and a given pressure between the contacting slabs has been reached.

28. In a slicing machine, the combination with a cutting element, of a feed conveyor arranged to feed slabs of bacon to the cutting element, a supply conveyor arranged to supply slabs of bacon to the feed conveyor, means for supplying slabs of bacon to the supply conveyor and driving mechanism for moving the supply conveyor at a sufficiently greater rate of speed than the feed conveyor for feeding slabs of bacon in end to end contact on the feed conveyor, said driving mechanism including a friction clutch for reducing the speed of the supply conveyor when the slabs are thus brought in end to end contact and a given pressure between the contacting slabs has been reached.

29. In a slicing machine, the combination with a cutting element, of a feed conveyor arranged to feed slabs of bacon to the cutting element, a supply conveyor arranged to supply slabs of bacon to the feed conveyor, means for supplying slabs of bacon to the supply conveyor and driving mechanism for moving the supply conveyor at a sufficiently greater rate of speed than the feed conveyor for feeding slabs of bacon in end to end contact on the feed conveyor, said driving mechanism including means for allowing slippage for reducing the speed of the supply conveyor when the slabs are thus brought in end to end contact and a given pressure between the contacting slabs has been reached.

NICKOLAS J. DZIEDZIC.
HARRY H. McKEE.